US008824677B1

(12) United States Patent
Ramzan et al.

(10) Patent No.: US 8,824,677 B1
(45) Date of Patent: Sep. 2, 2014

(54) PROVABLY SECURE AND EFFICIENT PSEUDORANDOM NUMBER GENERATION

(75) Inventors: Zulfikar Ramzan, Cupertino, CA (US); Sanjay Sawhney, Cupertino, CA (US); Virendra Kumar, Atlanta, GA (US)

(73) Assignee: Symantec Corporation, Mountain View, CA (US)

( * ) Notice: Subject to any disclaimer, the term of this patent is extended or adjusted under 35 U.S.C. 154(b) by 956 days.

(21) Appl. No.: 12/475,291

(22) Filed: May 29, 2009

(51) Int. Cl.
*H04L 9/06* (2006.01)
(52) U.S. Cl.
USPC .......................................... 380/268; 380/28
(58) Field of Classification Search
CPC ........................... H04L 9/0643; H04L 9/3033
USPC .................... 380/268, 28; 705/250
See application file for complete search history.

(56) References Cited

U.S. PATENT DOCUMENTS

| | | | | | |
|---|---|---|---|---|---|
| 5,778,069 | A | * | 7/1998 | Thomlinson et al. | 380/262 |
| 6,104,811 | A | * | 8/2000 | Aiello et al. | 380/46 |
| 2003/0086565 | A1 | * | 5/2003 | Desai et al. | 380/45 |
| 2006/0153376 | A1 | * | 7/2006 | Desai et al. | 380/46 |
| 2006/0186200 | A1 | * | 8/2006 | Nochta | 235/382 |
| 2006/0294312 | A1 | * | 12/2006 | Walmsley | 711/122 |
| 2010/0125728 | A1 | * | 5/2010 | Gueron et al. | 713/150 |

OTHER PUBLICATIONS

Haitner et al., "Efficient Pseudorandom Generators from Exponentially Hard One-Way Functions" Springer-Verlag, 2006, pp. 1-12.*
T. Holenstein, "Pseudorandom Generators from One-Way Function: A Simple Construction for Any Hardness," Springer-Verlag, 2006, pp. 1-19.*
Håstad, J., "Pseudo-Random Generators Under Uniform Assumptions," STOC, 1990, ACM, pp. 395-404.
Impagliazzo, R. et al., "Pseudo-Random Generation from One-Way Functions," in STOC, 1989, ACM, pp. 12-24.
Bellare, M. et al., "Hash Function Balance and Its Impact on Birthday Attacks," Eurocrypt 2004, Lecture Notes in Computer Science, Cachin, C. et al., eds., 2004, pp. 1-32, Springer-Verlag.
Bellare, M. et al., "Introduction to Modern Cryptography," May 11, 2005, 283 pages, [Online] [Retrieved on Jun. 16, 2009] Retrieved from the Internet<URL:http://www-cse.ucsd.edu/users/mihir/cse207/classnotes.html>.
Blum, M. et al., "How to Generate Cryptographically Strong Sequences of Pseudo Random Bits," FOCS, IEEE, 1982, pp. 112-117.
Boldyreva, A. et al., "How to Generate Pseudorandom Bits Using a Collision-Resistant Hash Function," 8 pages,.

(Continued)

*Primary Examiner* — Matthew Smithers
(74) *Attorney, Agent, or Firm* — Fenwick & West LLP (57) ABSTRACT

A pseudorandom number is generated from a random seed number using a collision-resistant hash function. A iteration input is extracted from the seed number. A hardcore predicate is applied to the iteration input to generate a pseudorandom bit. A pairwise-independent function is identified using a pairwise-independent function identifier extracted from the seed number and applied to the iteration input to produce a randomized iteration input. The collision-resistant hash function is applied to the randomized iteration input to produce a hash result and pad the output. The padded hash result is assigned as the iteration input for the next iteration. The process repeats iteratively and pseudorandom bits are generated using the hardcore predicate in each iteration until a predetermined number of pseudorandom bits are generated. The pseudorandom number is constructed using the generated pseudorandom bits.

20 Claims, 4 Drawing Sheets

(56) References Cited

OTHER PUBLICATIONS

Cochran, M. et al., "Notes on the Wang et al. $2^{63}$ SHA-1 Differential Path," Cryptography ePrint Archive: Report 2007/474, Dec. 18, 2007, pp. 1-18.

Damgård, I., "A Design Principle for Hash Functions," Crypto, 1989, pp. 416-427.

Desai, A. et al., "A Practice-Oriented Treatment of Pseudorandom Number Generators," Eurocrypt, 2002, 16 pages.

Goldreich, O. et al., "On the Existence of Pseudorandom Generators," SIAM Journal of Computing, IEEE, 1993, pp. 12-24, vol. 22, No. 6.

Goldreich, O. et al., "A Hard-Core Predicate for all One-Way Functions," STOC, ACM, 1989, pp. 25-32.

Goldwasser, S. et al., "Lecture Notes on Cryptography," Jul. 2008, 289 pages [Online] [Retrieved on Jun. 16, 2009] Retrieved from the Internet<URL:http://wwwcse.ucsd.edu/~mihir/papers.gb.html>.

Haitner, I. et al., "On the Power of the Randomized Iterate," In Crypto, Aug. 21, 2006, ECCC, TR05-135, 2005, 36 pages.

Håstad, J. et al., "A Pseudorandom Generator from any One-Way Function," SIAM Journal of Computing, 1999, pp. 1-33.

Levin, L., "One-Way Functions and Pseudorandom Generators," Combinatorica, 1987, pp. 357-363, vol. 7, No. 4.

Rompel, J., "One-Way Functions are Necessary and Sufficient for Secure Signatures," STOC, ACM, 1990, pp. 387-394.

Shoup, V., "NTL: A Library for Doing Number Theory," 1 page, [Online] [Retrieved on Jun. 16, 2009] Retrieved from the Internet<URL:http://shoup.net/ntl>.

Yao, A., "Theory and Applications of Trapdoor Functions (Extended Abstract)," FOCS, IEEE, 1982, pp. 80-91.

\* cited by examiner

PROVABLY SECURE AND EFFICIENT PSEUDORANDOM NUMBER GENERATION

BACKGROUND

1. Field of Disclosure

The disclosure generally relates to the field of cryptography, in particular to pseudorandom number generation.

2. Description of the Related Art

A great number of cryptographic algorithms and protocols rely on the existence of random bits. For example, secret keys used inside of cryptographic algorithms such as the Rivest-Shamir-Adleman encryption algorithm (RSA) as well as nonces used in various network protocols such as the Secure Sockets Layer (SSL) all require random bits.

Because of the challenges associated with finding a good (i.e., unpredictable high entropy) source of random bits, in practice one typically uses a relatively short and random seed value and expands it into a larger bit stream that is not purely random, but still useful, through the use of a pseudorandom bit generator (PRBG). Examples of the PRBG include the Federal Information Processing Standards Publication (FIPS) 186 generator and the /dev/urandom generator of a UNIX/LINUX system.

Because the usage of insecurely generated pseudorandom numbers subjects the underlying system to security risks (e.g., random number generator attacks), and the cost of correcting an insecure PRBG that has been deployed in the field can be prohibitively expensive, it is critical that the pseudorandom numbers are generated in a secure manner. The generation of pseudorandom numbers is secure if any adversary who is bounded by resource constraints cannot distinguish between the generated pseudorandom numbers and numbers that are truly random.

In addition, because the cryptographic algorithms and protocols using random numbers are widely used in real-time applications, the efficiency of generating pseudorandom numbers is also a critical goal in the design of PRBGs.

The existing approaches are insufficient to provide both provably secure and efficient pseudorandom number generation. On one hand, those approaches that are provably secure based on rigorous security analysis are often based on primitives that are inefficient for practical use. On the other hand, those approaches that are efficient usually come with weak security analysis.

Therefore, there is a need for an efficient and provably secure mechanism for generating pseudorandom numbers.

SUMMARY

Embodiments of the present disclosure include methods (and corresponding systems and computer-readable storage media) for efficiently generating pseudorandom numbers that are provably securely from random seed numbers.

One aspect of the present disclosure is a computer-implemented method for generating a pseudorandom number, comprising: determining a seed number; determining an iteration input based on an iteration input portion of the seed number; applying a hardcore predicate to the iteration input to generate a pseudorandom bit; applying a collision-resistant hash function to the iteration input to generate a hash result; assigning the hash result as the iteration input for a next iteration; constructing a pseudorandom number based on the pseudorandom bit; and outputting the pseudorandom number.

Another aspect of the present disclosure is a computer-readable storage medium encoded with executable computer program code for generating a pseudorandom number, the computer program code comprising program code for: determining a seed number; determining an iteration input based on an iteration input portion of the seed number; applying a hardcore predicate to the iteration input to generate a pseudorandom bit; applying a collision-resistant hash function to the iteration input to generate a hash result; assigning the hash result as the iteration input for a next iteration; constructing a pseudorandom number based on the pseudorandom bit; and outputting the pseudorandom number.

Still another aspect of the present disclosure is a computer system for generating a pseudorandom number, comprising: a computer-readable storage medium comprising executable computer program code for: a seed determination module for determining a seed number and determining an iteration input based on an iteration input portion of the seed number, a hardcore predicate module for applying a hardcore predicate to the iteration input to generate a pseudorandom bit, and a collision-resistant hash module for applying a collision-resistant hash function to the iteration input to generate a hash result, an iteration management and number construction module for assigning the hash result as the iteration input for a next iteration, constructing a pseudorandom number based on the pseudorandom bit, and outputting the pseudorandom number.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Notation

The following notation is used in this description. N denotes the set of natural numbers. If X is a set, then |X| denotes its size. If x, y are strings, then x∥y denotes the concatenation of x and y. If X is a finite set, then $$x \xleftarrow{\$} X$$

denotes that x is selected uniformly at random from X. When describing algorithms, a←b denotes that a is assigned the value b. An adversary is an algorithm. By convention, the running-time of an adversary includes that of its overlying experiment. All algorithms are assumed to be randomized and efficient, and all functions are assumed to be efficiently computable, unless noted otherwise.

System Environment

Figure 1:
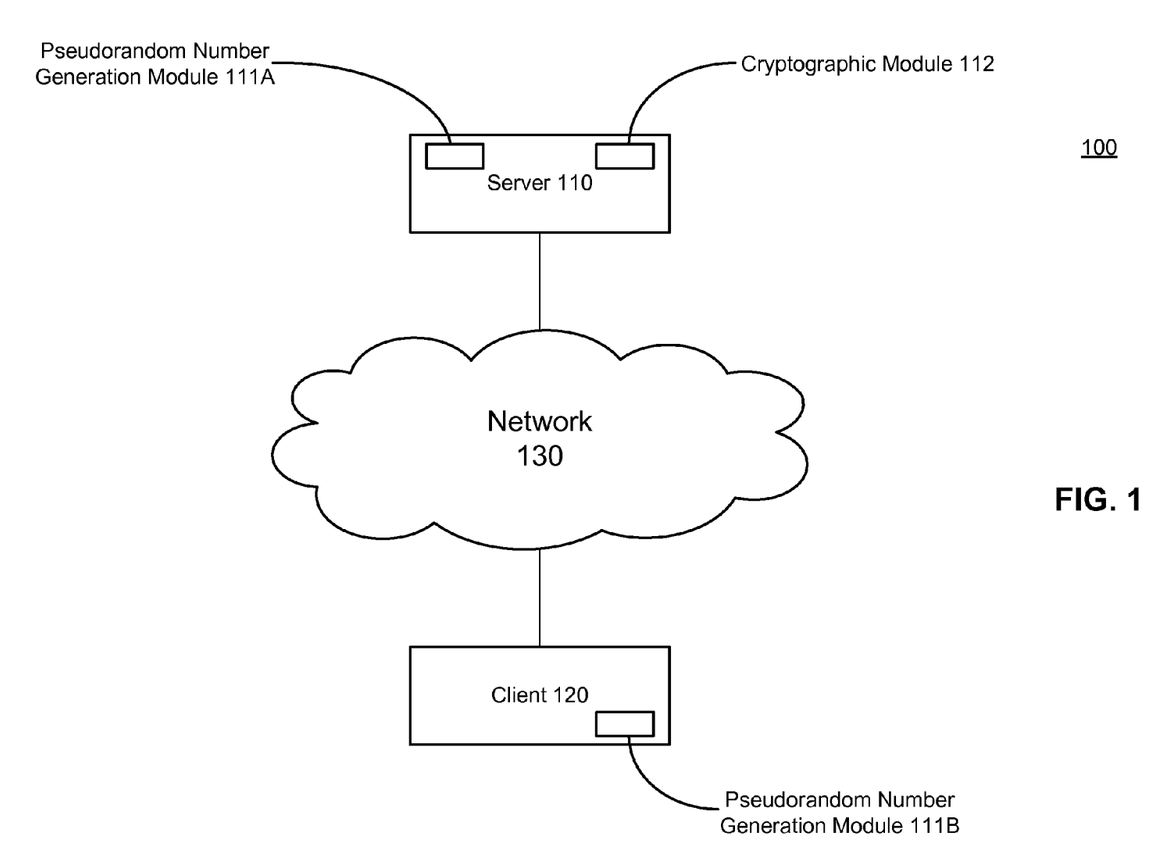
FIG. 1 is a high-level block diagram of a computing environment according to one embodiment of the present disclosure.

FIG. 1 is a high-level block diagram that illustrates a computing environment 100 for generating pseudorandom numbers, according to one embodiment of the present disclosure. As shown, the computing environment 100 includes a server 110 and a client 120, both connected to a network 130. Only one of each entity is illustrated in order to simplify and clarify the present description. There can be other entities in the computing environment 100 as well.

The server 110 is a hardware device and/or software program configured to provide clients 120 or other systems with cryptographic functions. Examples of the server 110 include an authentication server for authenticating clients and/or users and a product registration server for enabling registration of a purchased product and/or service. The server 110 includes a pseudorandom number generation module 111A and a cryptographic module 112.

The pseudorandom number generation module 111A is configured to generate pseudorandom numbers from short random seed numbers by iteratively applying a collision-resistant hash function to its own randomized output and outputting one or more pseudorandom bits in each iteration. A hash function is collision resistant if it is hard to find two inputs that hash to the same output (i.e., two inputs a and b such that h(a)=h(b)).

The cryptographic module 112 is configured to provide cryptographic functions using pseudorandom numbers generated by the pseudorandom number generation module 111A. Examples of the cryptographic functions include cryptographic key generation, user identifier/license key generation, and secure network protocol (e.g., SSL) establishment.

The client 120 is a computer system configured to communicate with the server 110. Examples of the client 120 include a personal computer, a mobile telephone, a personal digital assistant (PDA), etc. Similar to the server 110, the client 120 includes a pseudorandom number generation module 111B that is configured to generate pseudorandom numbers. The client 120 uses the pseudorandom numbers generated by the pseudorandom number generation module 111B to perform cryptographic operations such as establishing secured communication connections with the server 110 using SSL. In some embodiments, it is not necessary for both the client 120 and the server 110 to have module 111. In such embodiments, module 111 can be included in either entity. Modules 111A, 111B are shown in both the client 120 and the server 110 in FIG. 1 to illustrate the possible locations of the modules.

The network 130 enables communications between the server 110 and the client 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
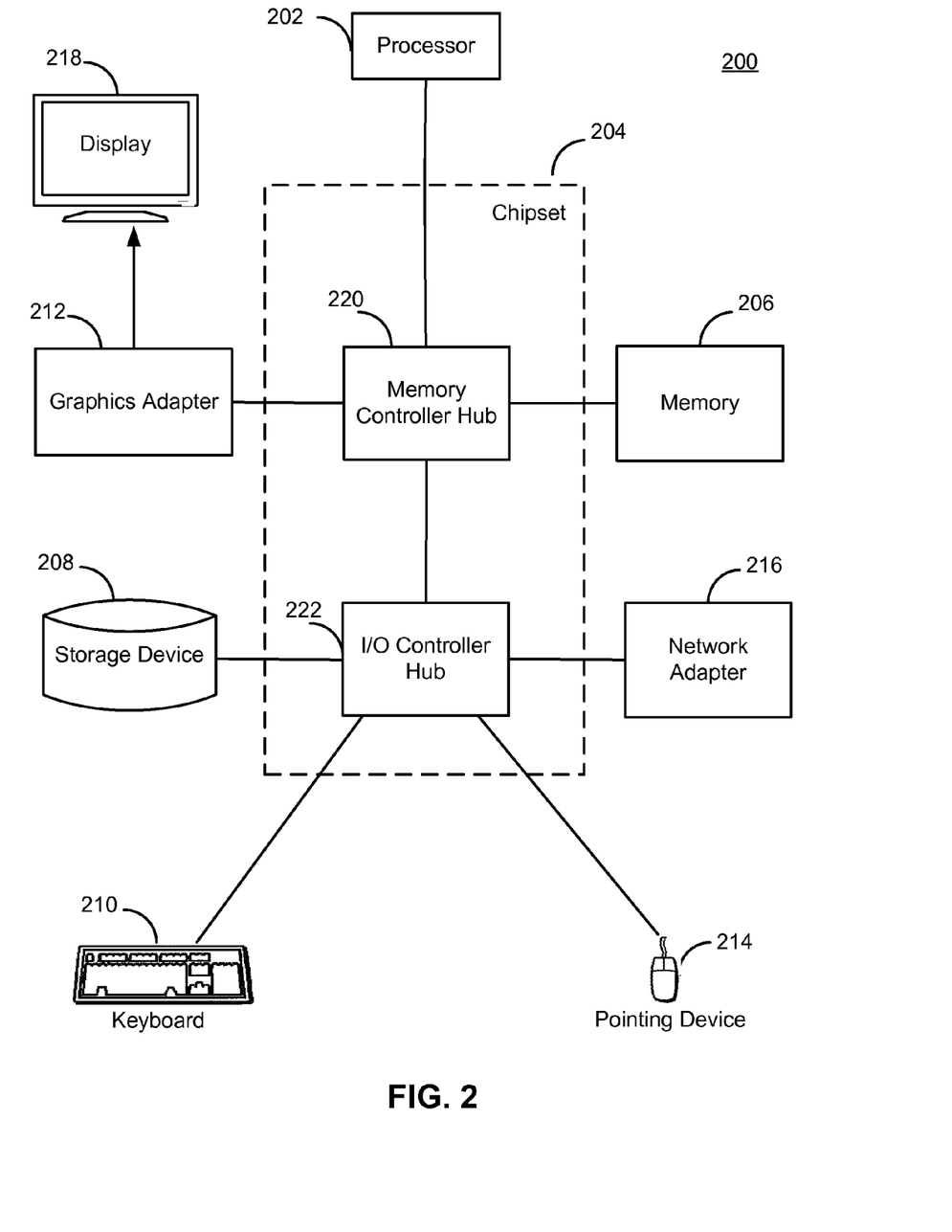
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the server 110 might comprise multiple blade servers working together to provide the functionality described herein. As another example, the client 120 might comprise a mobile telephone with limited processing power. The computers 200 can lack some of the components described above, such as keyboards 210, graphics adapters 212, and displays 218.

Example Architectural Overview of the Pseudorandom Number Generation Module

Figure 3:
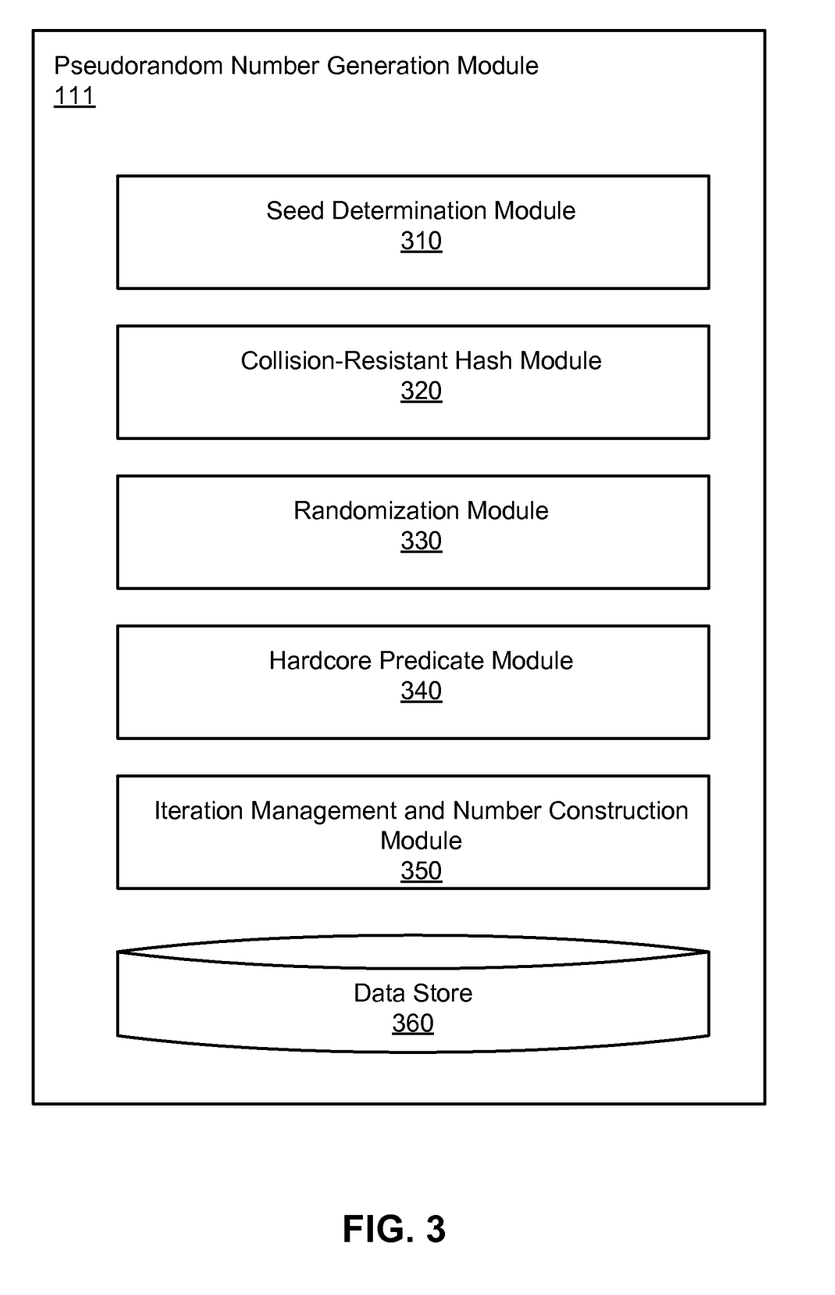
FIG. 3 is a high-level block diagram illustrating modules within a pseudorandom number generation module according to one embodiment of the present disclosure.

FIG. 3 is a high-level block diagram illustrating a detailed view of modules within a pseudorandom number generation module 111 (also called a pseudorandom bit generator or a pseudorandom number generator) according to one embodiment. Some embodiments of the pseudorandom number generation module 111 have different and/or other modules than the ones described herein. Similarly, the functions can be distributed among the modules in accordance with other embodiments in a different manner than is described here. As illustrated, the pseudorandom number generation module 111 includes a seed determination module 310, a collision-resistant hash module 320, a randomization module 330, a hardcore predicate module 340, an iteration management and number construction module 350, and a data store 360.

The seed determination module 310 determines random seed numbers that are used to generate pseudorandom numbers. The seed numbers can be provided from an external source (e.g., passwords or passphrases provided by users), retrieved from the data store 360 (e.g., from a pre-compiled list of random values), generated using a hardware random number generator, or computed using computational algorithms (e.g., the pseudorandom numbers generated by the pseudorandom number generation module 111 itself). Compared to the pseudorandom numbers to be generated from the seed numbers, the seed numbers often are shorter in length (e.g., having fewer bits or digits).

The seed determination module 310 separates a seed number into several portions and provides them to different modules. For example, module 310 can separate a random seed number into three portions, an iteration input portion, one or more pairwise-independent function identifier portions, and a hardcore predicate input portion (e.g., random seed number=iteration input ∥pairwise-independent function identifier∥hardcore predicate input). Module 310 provides the iteration input to the collision-resistant hash module 320 to determine a padded hash result, provides the pairwise-independent function identifier to the randomization module 330 to identify a pairwise-independent function, and provides the hardcore predicate input to the hardcore predicate module 340 to determine pseudorandom bits. Module 310 conducts the separation according to a predetermined template configurable based on attributes of the seed number and the pseudorandom number to be generated (e.g., their lengths, the randomness of the seed number, etc.).

The collision-resistant hash module 320 applies a collision-resistant hash function to a given value (i.e., the iteration input) to determine a hash result. As described above, a hash function is collision resistant if it is hard to find two inputs that hash to the same output. The following is a formal definition of a collision-resistant hash function: a hash function h:D→R is collision-resistant, if for every efficient adversary A, its advantage $\text{Adv}_A^{cr}(h)$ defined as $$\text{Adv}_A^{cr}(h) = \Pr_{x \xleftarrow{\$} D} [h(A(x)) = h(x) \wedge A(x) \neq x] \quad (1)$$

is small (close to 0). Examples of a collision-resistant hash function include message authentication code functions such as HMAC, Secure Hash Algorithm (SHA) hash functions such as SHA-1 and SHA-2, Message-Digest algorithm functions such as MD5, and other cryptographic hash functions. The pseudorandom number generation module 111 applies the collision-resistant hash function iteratively to generate a pseudorandom number. In an initial iteration, the iteration input is a portion of the seed number, and in subsequent iterations, the iteration input is the output (i.e., the padded hash result) of the most recent iteration.

The collision-resistant hash module 320 pads (or elongates) the hash result with zeros and/or ones (assuming the hash result is a binary string) and outputs the padded hash result. The number of zeros and/or ones to be padded is determined based on factors such as the length of the iteration input, the length of the hash result, and the collision-resistant hash function. For example, module 320 appends zeros to the end of the hash result such that the padded result has the same length as the iteration input.

The randomization module 330 randomizes the iteration input by applying functions of a pairwise-independent function family. A family of functions is said to be pairwise-independent if a function chosen at random from this family is such that the distribution of the images of the function is random. The following is a formal definition of a pairwise-independent function family: let F:D→R denote a family of functions, where each function f∈F maps from D to R. F is a pairwise-independent function family, if for all x≠x'∈D and all y≠y'∈R, $$\Pr_{f \xleftarrow{} F}[f(x) = y \wedge f(x') = y] = \frac{1}{|R|^2}. \quad (2)$$

Member functions of a pairwise-independent function family are called pairwise-independent functions.

Module 330 selects a pairwise-independent function from the family based on the pairwise-independent function identifier provided by module 310 (e.g., using the identifier as an index into the family). In one embodiment, to randomize the iteration inputs even further, module 310 provides module 330 with different identifiers at different iterations, causing module 330 to identify and apply different pairwise-independent functions at the different iterations. The following is an example of a pairwise-independent function family: assuming F is a finite field, the family h_{a,b}(x)=ax+b, indexed over the choice of a,b from F is a pairwise independent hash function family. To pick a function from this family, module 330 selects a and b from F.

The hardcore predicate module 340 determines pseudorandom bits by applying hardcore predicates to the current iteration input and the hardcore predicate input. A hardcore predicate of a function is a Boolean value that is at least as hard to predict as inverting the function itself. The following is a formal definition of a hardcore predicate: a hardcore predicate of a function f:D→R is a Boolean predicate b:D→{0,1}, if for every efficient adversary A, its advantage $\text{Adv}_A^{hcp}(f,b)$ defined as $$\text{Adv}_A^{hcp}(f, b) = \Pr_{x \xleftarrow{\$} D} [A(f(x)) = b(x)] - \frac{1}{2}, \quad (3)$$

is small (close to 0). It is customary to call the value b(x) the hardcore bit of f(x). An example hardcore predicate is the general hardcore predicate of Goldreich and Levin (hereinafter called the "GL-hardcorebit"). Let x, r∈D, then $b_r(x)=$ ⟨x,r⟩ mod 2 (i.e., $b_r(x)$ is the inner product of x and r modulo 2) is the GL-hardcore bit. Module 340 generates a single pseudorandom bit from an iteration input by applying a single hardcore predicate. Alternatively, module 340 can be configured to generate multiple pseudorandom bits from a single iteration input by applying multiple distinctive hardcore predicates to the iteration input.

The iteration management and number construction module 350 constructs pseudorandom numbers through randomized iterations. For an iteration input extracted from a random seed, module 350 applies the hardcore predicate module 340 to the iteration input to generate one or more pseudorandom bits, randomizes the iteration input by applying the randomization module 330, and applies the collision-resistant hash module 320 to the randomized iteration input to generate a padded hash result. Module 350 uses the padded hash result as the iteration input for the next iteration and repeats the process iteratively until a predetermined number of pseudorandom bits are generated (or a predetermined number of iterations are completed). The predetermined number is determined (e.g., by the pseudorandom number generation module 111) based on the seed number and the specific need of the cryptographic function requesting the pseudorandom number. For example, if a cryptographic function needs a 1024-bit pseudorandom number, the predetermined number of pseudorandom bits to be generated is 1024 (or smaller, if part of the seed number is used to construct the pseudorandom number).

Module 350 constructs a pseudorandom number using the pseudorandom bits. For example, module 350 can concatenate the pseudorandom bits into a bit string and use the numeric value of the bit string as the pseudorandom number. In one embodiment, in addition to using the generated pseudorandom bits, module 350 reuses part of the seed number to generate the pseudorandom number (e.g., the portion corresponding to the pairwise-independent function identifier, and/or the hardcore predicate input).

The data store 360 stores data used and/or generated by the pseudorandom number generation module 111. Examples of such data include a list of predetermined random seed numbers and a list of generated pseudorandom numbers. The data store 360 may be a relational database or any other type of database.

Overview of Methodology

Figure 4:
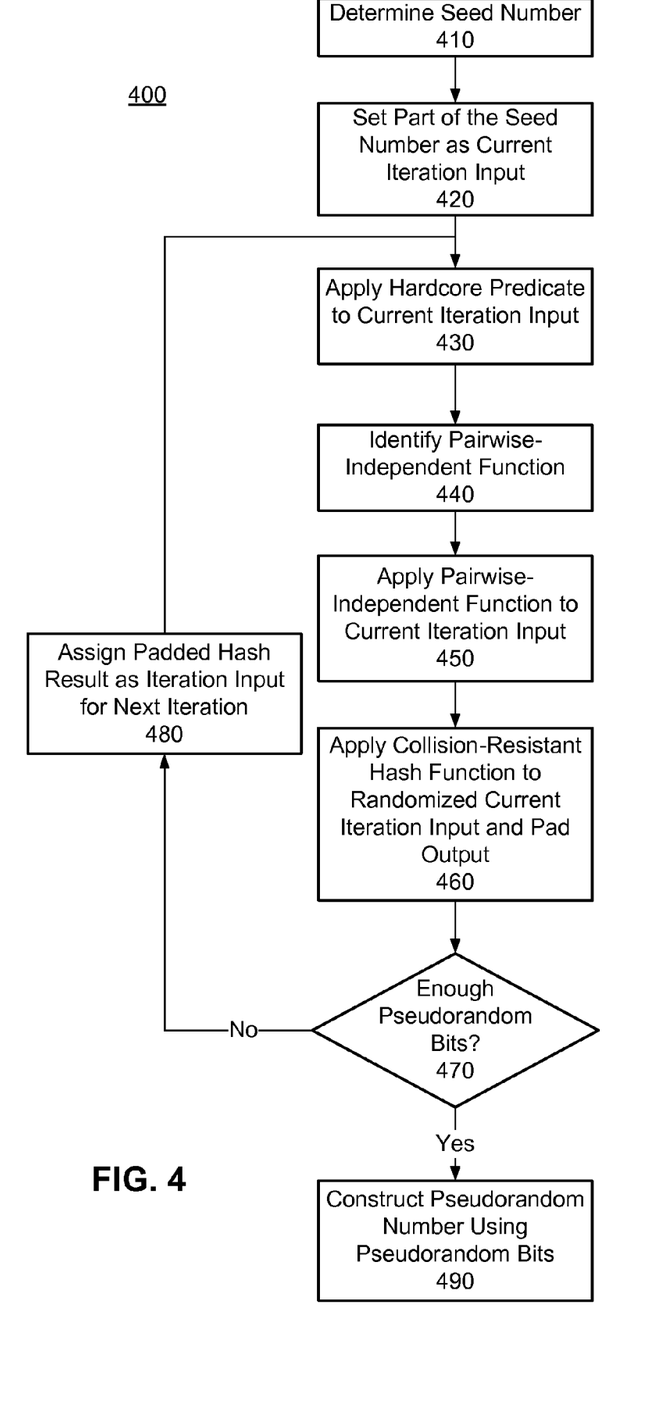
FIG. 4 is a diagram illustrating a process for generating a pseudorandom number using a collision-resistant hash function according to one embodiment of the present disclosure.

FIG. 4 is a diagram illustrating a process 400 for generating a pseudorandom number by a pseudorandom number generation module 111, according to one embodiment. Other embodiments can perform the steps of the process 400 in different orders. Moreover, other embodiments can include different and/or additional steps than the ones described herein.

Initially, the pseudorandom number generation module 111 determines 410 a seed number to be used to generate the pseudorandom number, and sets 420 a portion of the seed number (e.g., the first 320 bits) as the initial iterate input, a portion as the pairwise-independent function indicator, and another portion as the hardcore predicate input. In addition, the pseudorandom number generation module 111 determines a volume of pseudorandom bits to be generated (i.e., the predetermined number) based on the specific needs of the cryptographic function requesting the pseudorandom number (e.g., the pseudorandom number's bit-length).

The pseudorandom number generation module 111 applies 430 a hardcore predicate to the current iteration input to generate one (or more) pseudorandom bit(s). Module 111 then identifies 440 a pairwise-independent function from a pairwise-independent function family using the pairwise-independent function identifier, and applies 450 the identified pairwise-independent function to the current iteration input to produce a randomized iteration input. The pseudorandom number generation module 111 then applies 460 the collision-resistant hash function to the randomized iteration input to generate a hash result and pad the hash result.

The pseudorandom number generation module 111 determines 470 whether a predetermined number of pseudorandom bits (iterations) have been generated (completed) for constructing the pseudorandom number. If a predetermined number of pseudorandom bits have been generated, the pseudorandom number generation module 111 constructs 490 the pseudorandom number using the pseudorandom bits (e.g., by concatenating the pseudorandom bits together). Otherwise, the pseudorandom number generation module 111 assigns 480 the padded hash result as the iteration input for the next iteration and repeats the above process (steps 430-480) iteratively until sufficient pseudorandom bits are generated.

The pseudorandom number generation module 111 outputs the generated pseudorandom number. Depending on the specific application of the generated pseudorandom number, it can be stored in the data store 360, transmitted via the network 130, and/or displayed to a user (e.g., as a user identifier/license key). Alternatively or additionally, the pseudorandom number can be used as a security key or a nonce to perform cryptographic operations and the results of which in turn can be stored and/or transmitted.

The method 400 is further illustrated through the following example implementation.

Let $h:\{0,1\}^m \to \{0,1\}$ be a hash function and let $F:\{0,1\}^m \to \{0,1\}^m$ be a pairwise-independent function family. For $t \in N$, $f_1, \ldots, f_{m+t-2} \in F$, $x, r \in \{0,1\}^m$, the output of the pseudorandom generator $G(x, f_1, \ldots, f_{m+t-2}, r)$ is:

$$(b_r(x), b_r(x^1), \ldots, b_r(x^{m+t-1}), f_1, \ldots, f_{m+t-2}, r), \qquad (4)$$

where t stands for the expansion factor of G, $x^i$ is defined as:

$$x^i = \begin{cases} h(x) \| 0^{m-n} & i = 1 \\ h(f_{i-1}(x^{i-1})) \| 0^{m-n} & i > 1 \end{cases}, \qquad (5)$$

and $b_r(x^i)$ denotes the GL-hardcore bit, i.e. the inner product of $x^i$ and r.

In the above construction, the pseudorandom number generation module 111 determines an expansion factor t that determines the number of iterations to be performed (m+t−1). For each iteration, module 111 applies the GL-hardcore bit to the current iteration input, applies a pairwise-independent function to the current iteration input, and then applies hash function h to the output of the pairwise-independent function. It then pads the hash output with sufficient number (m−n) of zeros and outputs the padded hash output as the next iteration input. Module 111 then constructs the pseudorandom number by concatenating the pseudorandom bits with the pairwise-independent function identifiers ($f_1, \ldots, f_{m+t-2}$), and the hardcore predicate identifier (r).

The above example illustrates how to generate a pseudorandom number using a collision-resistant hash function with fixed size domains of type $\{0,1\}^m$, for m∈N. Because most, if not all, known practical cryptographic hash functions have an arbitrary sized domain $\{0,1\}^*$, for such hash functions, the value of in can be set to be any integer greater than n. Therefore these cryptographic hash functions can be utilized by module 111 to expand random seeds to any length.

The above example method of generating pseudorandom numbers is provably secure. It is proved that if the security of this method can be broken, then it is possible to find collisions in the hash function. As a result, the analysis of security only relies on the collision-resistance of the hash function. Thus, by using a collision-resistant hash function, the method is provably secure.

The above method is also efficient. Because the security analysis of the method relies on only the collision-resistance of the underlying hash function, which is a reasonable assumption of a cryptographic hash function, the pseudorandom number generation module 111 can use existing cryptographic hash functions (e.g., SHA-1, SHA-2, MD5) to generate pseudorandom numbers provably securely. These cryptographic hash functions are much more efficient comparing to functions used in other pseudorandom number generators that are provably secure (e.g., one-way permutation functions). Therefore, by using the more efficient cryptographic hash functions, instead of the inefficient functions that are used by the other pseudorandom number generators, the pseudorandom number generation module 111 implementing the method 400 are much more efficient comparing to the other provably secure pseudorandom number generators.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for provably securely and practically efficiently generating pseudorandom numbers using a collision-resistant hash function. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for generating a pseudorandom number, comprising:
using a computer to perform steps comprising:
determining a seed number;
determining an iteration input based on an iteration input portion of the seed number;
applying a hardcore predicate to the iteration input to generate a pseudorandom bit;
applying a cryptographic collision-resistant hash function to the iteration input to generate a hash result;
assigning the hash result as the iteration input for a next iteration;
constructing a pseudorandom number based on the pseudorandom bit; and
outputting the pseudorandom number.

2. The computer-implemented method of claim 1, further comprising:
applying a pairwise-independent function to the iteration input to generate a randomized iteration input,
wherein applying the cryptographic collision-resistant hash function to the iteration input comprises applying the cryptographic collision-resistant hash function to the randomized iteration input to generate the hash result.

3. The computer-implemented method of claim 2, further comprising:
determining a pairwise-independent function identifier based on a pairwise-independent function identifier portion of the seed number; and
identifying the pairwise-independent function from a pairwise-independent function family using the pairwise-independent function identifier.

4. The computer-implemented method of claim 3, wherein constructing the pseudorandom number further comprises constructing the pseudorandom number using at least one bit of the pairwise-independent function identifier as a part of the pseudorandom number.

5. The computer-implemented method of claim 1, further comprising:
iteratively applying the cryptographic collision-resistant hash function to the iteration input to generate hash results, assigning the hash results as the iteration inputs of subsequent iterations, and applying the hardcore predicate to the iteration inputs until a predetermined number of pseudorandom bits are generated, wherein the pseudorandom number is constructed using the predetermined number of pseudorandom bits.

6. The computer-implemented method of claim 1, further comprising:
determining a hardcore predicate input based on a hardcore predicate input portion of the seed number,
wherein applying the hardcore predicate to the iteration input further comprises applying the hardcore predicate to the iteration input and the hardcore predicate input to generate the pseudorandom bit, and
wherein constructing the pseudorandom number further comprises constructing the pseudorandom number using at least one bit of the hardcore predicate input as a part of the pseudorandom number.

7. The computer-implemented method of claim 1, further comprising:
  determining an expansion factor that determines a number of iterations to be performed to yield a desired length of the pseudorandom number; and
  performing the number of iterations indicated by the expansion factor, where each iteration comprises:
    the application of the hardcore predicate to the iteration input to generate the pseudorandom bit;
    the application of the cryptographic collision-resistant hash function to the iteration input to generate the hash result; and
    the assignment of the hash result as the iteration input for the next iteration.

8. The computer-implemented method of claim 1, wherein the cryptographic collision-resistant hash function comprises a function selected from a group consisting of: SHA-1, SHA-2, and HMAC.

9. The computer-implemented method of claim 1, wherein the cryptographic collision-resistant hash function has a property that it is hard to find two inputs that hash to a same output.

10. The computer-implemented method of claim 1, wherein the cryptographic collision-resistant hash function comprises a hash function h that, for every efficient adversary A, has an advantage $\text{Adv}_A^{cr}(h)$ that is close to zero, wherein the advantage is defined as:

$$\text{Adv}_A^{cr}(h) = \Pr_{x \xleftarrow{\$} D} [h(A(x)) = h(x) \wedge A(x) \neq x]$$

wherein:
  Pr is a probability; and $$x \xleftarrow{\$} D$$

denotes selecting a value x uniformly at random from a set of values D.

11. A non-transitory computer-readable storage medium encoded with executable computer program code for generating a pseudorandom number, the computer program code comprising program code for:
  determining a seed number;
  determining an iteration input based on an iteration input portion of the seed number;
  applying a hardcore predicate to the iteration input to generate a pseudorandom bit;
  applying a cryptographic collision-resistant hash function to the iteration input to generate a hash result;
  assigning the hash result as the iteration input for a next iteration;
    constructing a pseudorandom number based on the pseudorandom bit; and
    outputting the pseudorandom number.

12. The computer-readable storage medium of claim 11, wherein the computer program code further comprises program code for:
  applying a pairwise-independent function to the iteration input to generate a randomized iteration input,
  wherein applying the cryptographic collision-resistant hash function to the iteration input comprises applying the cryptographic collision-resistant hash function to the randomized iteration input to generate the hash result.

13. The computer-readable storage medium of claim 12, wherein the computer program code further comprises program code for:
  determining a pairwise-independent function identifier based on a pairwise-independent function identifier portion of the seed number; and
  identifying the pairwise-independent function from a pairwise-independent function family using the pairwise-independent function identifier.

14. The computer-readable storage medium of claim 13, wherein constructing the pseudorandom number further comprises constructing the pseudorandom number using at least one bit of the pairwise-independent function identifier as a part of the pseudorandom number.

15. The computer-readable storage medium of claim 11, wherein
  the computer program code further comprises program code for:
  iteratively applying the cryptographic collision-resistant hash function to the iteration input to generate hash results, assigning the hash results as the iteration inputs of subsequent iterations, and applying the hardcore predicate to the iteration inputs until a predetermined number of pseudorandom bits are generated, wherein the pseudorandom number is constructed using the predetermined number of pseudorandom bits.

16. The computer-readable storage medium of claim 11, wherein the computer program code further comprises program code for:
  determining a hardcore predicate input based on a hardcore predicate input portion of the seed number,
  wherein applying the hardcore predicate to the iteration input further comprises applying the hardcore predicate to the iteration input and the hardcore predicate input to generate the pseudorandom bit, and
  wherein constructing the pseudorandom number further comprises constructing the pseudorandom number using at least one bit of the hardcore predicate input as a part of the pseudorandom number.

17. The computer-readable storage medium of claim 11, wherein applying the cryptographic collision-resistant hash function further comprises:
  padding the hash result with zeros to produce a padded hash result, a length of the padded hash result equal a length of the iteration input, wherein assigning the hash result further comprises assigning the padded hash result as the iteration input for the next iteration.

18. A computer system for generating a pseudorandom number, comprising:
  a processor; and
  a non-transitory computer-readable storage medium comprising executable computer program code for execution on the processor, the program code executable to perform steps comprising:
    determining a seed number and determining an iteration input based on an iteration input portion of the seed number,
    applying a hardcore predicate to the iteration input to generate a pseudorandom bit,
    applying a cryptographic collision-resistant hash function to the iteration input to generate a hash result,
    assigning the hash result as the iteration input for a next iteration,
    constructing a pseudorandom number based on the pseudorandom bit, and
    outputting the pseudorandom number.

19. The computer system of claim 18, the computer-readable storage medium further comprising computer program code executable to:
apply a pairwise-independent function to the iteration input to generate a randomized iteration input,
wherein the cryptographic collision-resistant hash function is applied to the randomized iteration input to generate the hash result.

20. The computer system of claim 19, the computer-readable storage medium further comprising computer program code executable to determine a pairwise-independent function identifier based on a pairwise-independent function identifier portion of the seed number, and identify the pairwise-independent function from a pairwise-independent function family using the pairwise-independent function identifier.

* * * * *